Patented Apr. 24, 1934

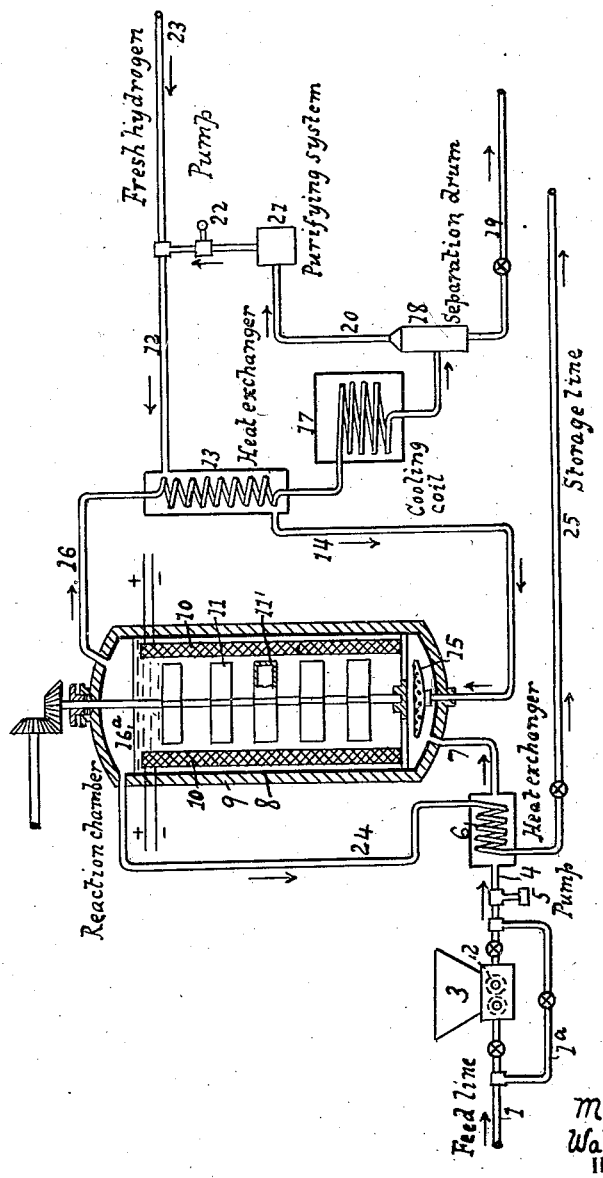

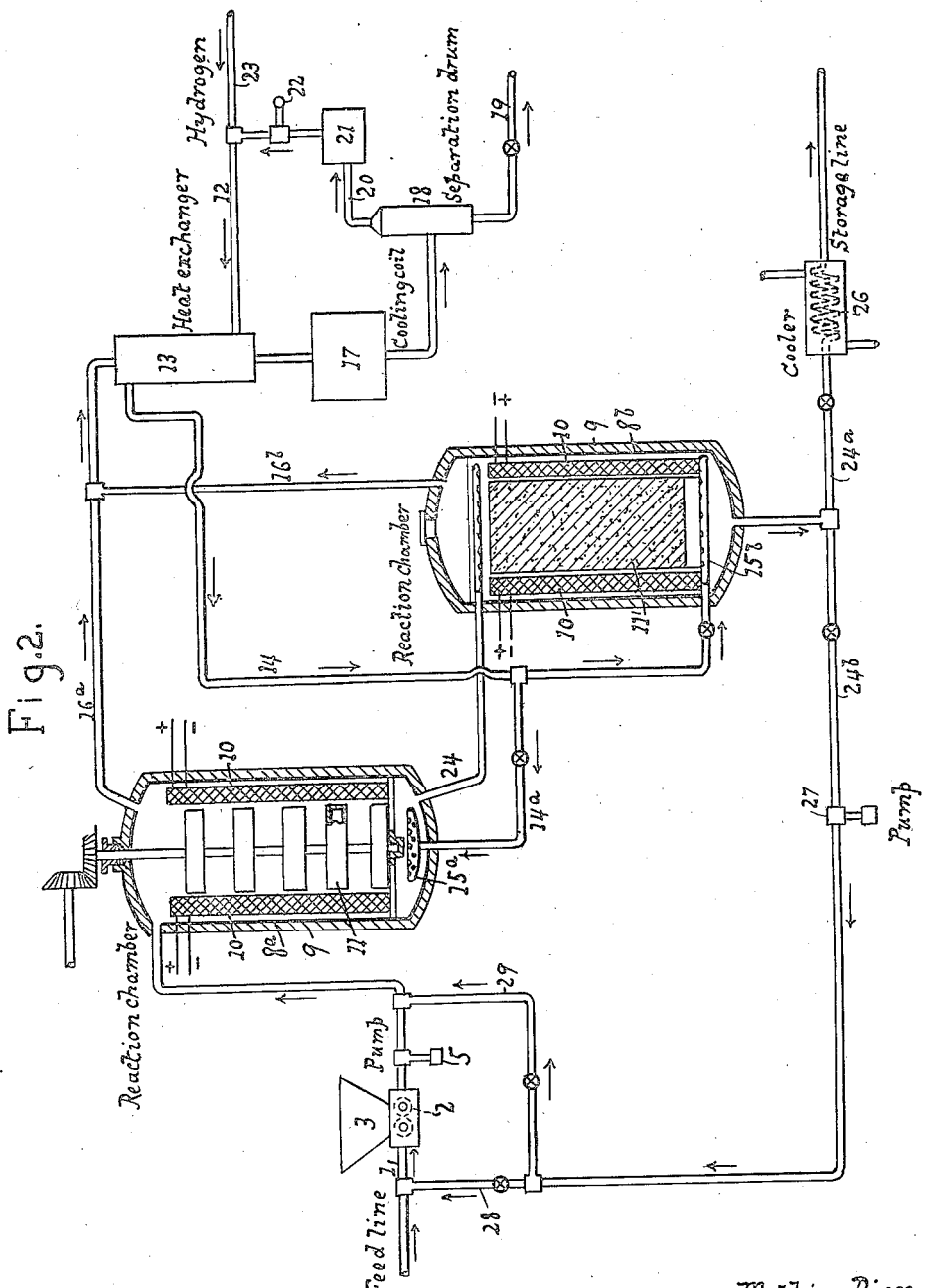

1,955,829

UNITED STATES PATENT OFFICE 1,955,829

CONVERSION OF CARBONACEOUS MATERIALS INTO USEFUL HYDROCARBON PRODUCTS

Mathias Pier, Heidelberg, and Walter Kroenig, Ludwigshafen-on-the-Rhine, Germany, assignors to Standard-I. G. Company, Linden, N. J., a corporation of Delaware Application August 27, 1930, Serial No. 478,101 In Germany August 31, 1929

20 Claims. (Cl. 196—53)

This invention relates to improvements in the production of useful hydrocarbon products, namely hydrocarbons and hydrocarbon derivatives, from distillable carbonaceous materials by treatment with hydrogen or a gas comprising hydrogen at a sufficiently elevated temperature to promote the conversion or desired degree of purification, and to improved catalysts therefor. The invention is concerned more particularly with the destructive hydrogenation of carbonaceous materials and with the refining of crude hydrocarbons with the aid of gases comprising hydrogen.

We have found that especially good yields of useful hydrocarbon products are obtained in the aforesaid processes from distillable carbonaceous materials, such as coal of all varieties, tars, mineral oils, the distillation, extraction and conversion products thereof and the like when catalysts containing a negative solid element of the sixth group of the periodic system, namely sulphur, selenium or tellurium, in a combined state are employed, which have been prepared by treatment of metals as such or in the form of their compounds, especially oxides, if desired in mixture with one another or with other additions, in the solid phase with volatile compounds of negative solid elements of the sixth group of the periodic system in the divalent state and hydrogen or a gas comprising hydrogen at an elevated temperature and at any desired pressure, but in the absence of added hydrocarbons. In accordance with the present invention volatile compounds of sulphur are preferably employed in the preparation of the catalyst, but volatile compounds of selenium or tellurium may also be employed. The said treatment for the production of catalysts with said volatile compounds of sulphur, selenium or tellurium and hydrogen is usually carried out at temperatures above 200° C. and advantageously above 300° C., preferably for a considerable period of time. Temperatures of between 200° and 600° C. are usually employed, but temperatures of between 400° and 500° C. give particularly good results. The pressures employed in the production of the catalyst are advantageously not less than atmospheric. Pressures of 5 or 20 atmospheres give good results and with pressures of 50, 100, 200, 500 atmospheres or more the duration of treatment for the preparation of the catalyst is very considerably shortened. The concentration of the said volatile compounds present in the gas may vary considerably. The partial pressure thereof may, for example, be between 0.05 and 20 per cent, but preferably between 0.05 and 5 per cent and usually above 1 per cent of the total pressure.

The treatment of the metals or compounds thereof to prepare the catalyst may, for example, be carried out with mixtures of hydrogen with hydrogen sulphide, carbon disulphide, mercaptans, thiophene and its homologues, alkyl sulphur compounds, thioethers and other volatile sulphur compounds or with hydrogen selenide or hydrogen telluride. The metals or compounds of metals employed for treatment for the production of catalysts according to the present invention are those usually employed in destructive hydrogenation processes. Particularly good results are obtained when treating vanadium or the metals of the sixth group of the periodic system, namely molybdenum, tungsten, chromium, and uranium, or compounds, especially the oxides, of these metals, and these may be used either alone, or in mixture, for example alloys, with each other or with metals of groups 2, 3 and 7 of the periodic system, such as zinc, magnesium, aluminium, cadmium and copper, or compounds, especially the oxides, of these metals. As specific examples of such mixtures which may be employed for the production of catalysts according to the present invention may be mentioned the following: 80 parts of tungstic oxide and 20 parts of zinc oxide; 75 parts of tungstic oxide and 25 parts of aluminium hydroxide; 79 parts of tungstic oxide and 21 parts of silicic acid; 68 parts of tungstic oxide, 24 parts of zinc oxide and 8 parts of silicic acid; 54 parts of tungstic oxide and 46 parts of cadmium oxide; 95 parts of tungstic oxide and 5 parts of beryllium oxide; 64 parts of molybdic oxide and 36 parts of zinc oxide; 90 parts of tungstic oxide and 10 parts of chromic oxide; 90 parts of molybdic oxide, 10 parts of chromium oxide, 20 parts of kaolin and 0.6 part of aluminium; 70 parts of tungstic oxide, 24 parts of zinc oxide and 6 parts of magnesium oxide; 70 parts of tungstic oxide, 24 parts of zinc oxide and 6 parts of phosphoric acid; 70 parts of tungstic oxide, 24 parts of zinc oxide and 6 parts of boron phosphate; 80 parts of tungstic oxide, 19 parts of zinc oxide and 1 part of cerium oxide; 92 parts of tungstic oxide, 7 parts of magnesium oxide and 1 part of thorium oxide; 92 parts of tungstic oxide and 8 parts of magnesium oxide; 90 parts of tungstic oxide and 10 parts of cerium oxide; 72 parts of tungstic oxide and 28 parts of basic nickel carbonate; 73 parts of tungstic oxide and 27 parts of basic cobalt carbonate; 67 parts of tungstic oxide, 27 parts of basic nickel carbonate and 6 parts of phosphoric acid; 69 parts of tungstic oxide, 25 parts of basic cobalt carbonate and 6 parts of phosphoric acid; 90 parts of tungstic oxide and 10 parts of titanium oxide; 91 parts of vanadium pentoxide and 81 parts of zinc oxide.

During the preparation of the catalysts in accordance with the present invention, the aforesaid metals of the sixth group of the periodic system and also vanadium are completely converted into their sulphides, selenides or tellurides, respectively. It appears that the said sulphides, selenides or tellurides are present in the new catalysts in a particular physical form, the nature of which is not yet known to us, because the catalysts possess properties whereby they are substantially different from catalysts containing negative solid elements of the sixth group of the periodic system prepared in other ways; thus the activity of the new catalysts remains constant or nearly constant even when in use for a very long time, whereas in the case of other catalysts of a chemically similar composition the activity is substantially reduced more or less rapidly. Moreover, catalysts prepared according to the present invention have the property of being much less liable to the formation of condensation products on their surface than catalysts containing negative solid elements of the sixth group of the periodic system prepared in other ways, so that due to this property their working life is also considerably increased.

The new catalysts are also very stable in storage, provided they have been carefully cooled to temperatures below 50° C. immediately after their production; such careful cooling may be effected by allowing them to cool in an atmosphere either of the hydrogen containing volatile compounds of negative solid elements of the sixth group of the periodic system, or of an inert gas such as nitrogen or carbon dioxide, but in any case in the absence of hydrocarbon products. Due to the said stability in storage, the new catalysts have the advantage that they can be kept in stock and are at once ready for use at any time.

The preparation of the catalyst may be carried out in a reaction vessel which is the same or different from that in which the subsequent treatment is to be carried out. As has been pointed out above, the preparation must be effected in the absence of hydrocarbon products. This is very essential, since otherwise catalysts would be obtained which do not possess the valuable properties enumerated in the foregoing. Therefore, when the preparation of the catalysts is to be effected, for example, with hydrogen and the volatile sulphur compounds contained in crude natural gas, the latter must be carefully separated from the accompanying hydrocarbons before being used for the said purpose.

The catalytic masses obtained according to the present invention are characterized not only by an excellent hydrogenating power, but also by an excellent action in the splitting up of high molecular carbon compounds, whether of open chain or of cyclic nature. They are therefore very favorable for the production of non-knocking motor fuels. In addition thereto they may also find useful application in other chemical operations, as for example in the cracking of hydrocarbon oils of high boiling point.

The strongly increased activity of the said catalysts renders it possible to carry out the aforesaid treatment of distillable carbonaceous materials with hydrogen, and particularly destructive hydrogenations at lower temperatures than those hitherto employed, and in this manner the undesirable formation of gases, such as methane and the like, as well as the danger of an impoverishment in hydrogen in the resulting products are very effectively counteracted. Moreover, even in that small part of the initial materials which may be converted into gaseous hydrocarbons, the formation of methane is suppressed in favor of the formation of its higher homologues, and thus less hydrogen is consumed.

In order to continuously maintain the good activity of the catalysts during operation, especially when working with the hydrogenating gas in circulation, it is advantageous to maintain a definite concentration of a volatile compound of a negative solid element of the sixth group in the hydrogenating gas as, for example, from 0.5 to 2 per cent of hydrogen sulphide in the case of sulphur containing catalysts. When employing initial materials which are poor in sulphur, volatile sulphur compounds of any kind may in some cases be continuously or periodically added to the initial materials or to the flowing gases. The concentration of hydrogen sulphide in the flowing gases depends primarily on the kind of catalyst employed, especially on the state of equilibrium between the different sulphides and metals, on the one hand, and the hydrogen sulphide, on the other hand.

The process of treating carbonaceous materials with hydrogen or gases containing hydrogen in accordance with the present invention is very suitable for the production of low boiling products from higher boiling materials, such as benzines from middle oils, and also the preparation of products rich in hydrogen for example, illuminating oils, for the production and refining of lubricating oils and also for refining benzines, illuminating oils and the like.

The process of destructive hydrogenation with the said catalysts may be carried out at temperatures as low as about 200° C., but preferably temperatures of between 300° and 550° C. are employed. The pressures employed range between atmospheric, when highly active catalysts are employed, and very high pressures of 1000 atmospheres or even more. Pressures of 20, 50, 100, 200, 500 or 800 atmospheres are as a rule most advantageous and are therefore typical for the process according to the products required.

In the accompanying drawings, an apparatus for carrying out the one stage destructive hydrogenation process and an apparatus for carrying out the two stage process, both being continuous, in accordance with the present invention are illustrated diagrammatically, partly in vertical section. Our invention is not limited to the apparatus illustrated therein, however, but may be varied at will in accordance with the conditions of working.

Referring to the drawings in Figure 1 in detail, reference numeral 1 indicates a feed line from any convenient source of liquid raw material. The line 1 discharges to a grinding mechanism 2 fitted with a hopper 3 through which solid materials may be admitted. If desired, the grinding mechanism can be by-passed by line 1a when no solid materials are used. The suspension of solid material in liquid or the liquid alone may be then forced by pump 5 through a line 4 to a heat exchanger 6 and thence by line 7 into a reaction chamber 8. The reaction chamber is constructed in any preferred manner and should be adapted to withstand high pressures, for example, above 20 to 100 or even as high as 800 atmospheres, as well as the corrosive effects of the reactants. The vessel is preferably protected from loss of heat by a suitable insulating cover 9 and may be heated by electric coils 10 which are arranged within the drum. The contents of the drum are preferably kept in a state of agitation by means of a stirring mechanism 11 and suitable catalytic materials 11' as indicated above may either be attached to the stirring mechanism so that the catalyst is brought into intimate contact with the contents of the vessel, or the catalyst may be employed in a state of suspension, if desired, colloidal suspension.

Hydrogen under high pressure is forced through a line 12, heat exchanger 13 and then by line 14 into the base of the reactor 8 into which it is preferably discharged through a spray pipe 15. A liquid level may be maintained in the drum, for example, at the point 16a and gas and vaporous products may be continuously withdrawn by vapor line 16 which is in communication with exchanger 13 and a cooling coil or condenser 17. The condensate and gas is discharged into a separation drum 18 from which the distillate is removed by line 19 to storage, not shown. The gas may be taken off by a pipe 20 to a purifying system indicated at 21, and which may comprise a scrubbing system preferably carried out at high pressure using, for example, soda to remove hydrogen sulphide and oil to remove hydrocarbon constituents from the gas. Purified gas is then recompressed by a booster pump 22 and is forced again into the hydrogen feed line 12. Fresh hydrogen may be introduced by line 23. If desired, oil may be continuously removed from the drum by a line 24 which communicates with heat exchanger 6 and this oil is withdrawn to storage, not shown, by a suitable line 25.

Referring now to the drawings in Figure 2 a suitable system is shown for converting solid materials into light liquid oils by two steps. Where possible, the same numeral has been used in Figure 2 as has already been indicated in Figure 1. Hydrocarbon oil is withdrawn from any suitable storage, not shown, by a line 1 and may be forced through a grinding mechanism 2 which is fitted with the hopper 3 for the introduction of solid material, such as coal, lignite or the like. The pump 5 forces this mixture through line 4 into the first oven indicated by the numeral 8a. This oven may be constructed in the same manner as the oven 8 shown in Figure 1 and similar parts are designated by the same numerals. A heavy liquefied material is withdrawn from the base of the oven 8a and may be continuously discharged into the second oven indicated by 8b. This oven is packed with a suitable solid catalytic material in accordance with the present invention indicated at 11' and with the exception that no stirring mechanism is used it may be constructed similarly to oven 8a.

Hydrogen is forced under high pressure from the line 12, as before, through a heat exchanger 13 and by line 14 and branches 14a and 14b into oven 8a and 8b respectively. Vaporous products and gas are removed from both ovens by vapor line 16a and 16b respectively which may discharge through a single exchanger 13 to condenser 17. The light oils are separated from the gases in the separator 18 from which the oil is removed by 19 and the gases may be removed, purified and recompressed as indicated in Figure 1. Heavy oil may be continuously withdrawn from the oven 8b and a part or the whole thereof may be continuously discharged through a line 24a, cooler 26 and conducted by line 25 to any suitable storage. If desired, a part of this oil may be re-circulated to line 1 or to line 4 by means of recirculation line 24b, pump 27 and either of the two lines 28 or 29, as is desired.

In the operation of this system solid carbonaceous material containing ash may be continuously fed to the first oven and a sufficient quantity of the oil containing inorganic material may be led from the system by the lines 24a and 25, so as to prevent accumulation within the system. Fresh hydrocarbon oil may be continuously fed in sufficient quantity to carry in the solid material or, if desired, a part of the oil withdrawn from the second oven, either containing ash or from which the ash has been removed by filtration, settling centrifugal means or the like may be recirculated for the purpose of bringing in the fresh solid material.

In the following examples the time of reaction varies considerably, as might be supposed, depending on the nature of the raw material, the activity of the catalyst, temperature, pressure and the like. In practice it is desirable to make a few preliminary runs in order to determine the time required for the best yields under a given set of conditions. Generally speaking, with batch operations the total time may be from two to ten hours or more, depending on the yield desired, while with continuous operations the time is usually shorter. When continually feeding liquid or difficultly vaporizable oils, the rate of flow may be in the neighborhood of .3 to .8 volume of oil per hour per volume of reaction space. Vaporous materials may be treated at higher temperatures and the feed rate may consequently be one or even one and one-half volumes per hour per volume of reaction space. The volume of hydrogen may likewise vary considerably and should always, of course, be in excess of that actually required for the conversion; for example, the rate of flow of hydrogen may be in excess of about 600 liters per kilogram of carbonaceous material.

The following examples will serve to further explain how our invention is carried out in practice, but we do not restrict our invention to these examples. The parts are by weight.

*Example 1*

80 parts of tungstic acid and 20 parts of zinc oxide are moistened with water. The mass thus obtained is pressed under high pressure and broken into pieces of suitable size. These are then heated slowly with hydrogen under a pressure of 200 atmospheres in a high pressure reaction vessel, whereby from a temperature of 200° C. upwards so much carbon bisulphide is added to the hydrogen that the partial pressure of the carbon bisulphide amounts to about 1 atmosphere. After attaining a temperature of 460° C., this temperature is maintained for 48 hours while continually adding carbon bisulphide to the hydrogen supplied to the reaction vessel. The amount of carbon bisulphide added is so adjusted that the said partial pressure of about 1 atmosphere is maintained during the whole operation. The addition of carbon bisulphide is then discontinued and the temperature reduced to 425° C. If at this temperature and under a pressure of 200 atmospheres a mixture of hydrogen and an oil boiling between 200° and 325° C. which has been prepared by the destructive hydrogenation of brown coal be led over the catalyst thus prepared, a product which consists to the greater part of correct-boiling benzine, is obtained. The middle oil obtained in addition to the benzine has become much richer in hydrogen, contrasted with the initial product, so that this middle oil which may be separated from the benzine by fractional condensation may be converted into benzine even more easily than the initial product.

If of an American crude oil, a fraction boiling between 200° and 300° C. which has a relatively high content of sulphur and unsaturated compounds and which cannot be employed for illuminating purposes, be led together with hydrogen at a temperature of about 390° C. and under a pressure of 200 atmospheres over the catalyst hereinbefore specified an oil can be condensed from the vapors issuing from the reaction vessel which apart from small amounts of benzine consists of a fraction boiling between 190° and 290° C., which on account of its high content of hydrogen and the very small content of sulphur and unsaturated compounds, the viscosity and other properties, is very suitable as illuminating oil.

Instead of the said fraction of the American crude oil, the same fraction of an oil obtained by catalytic destructive hydrogenation of a low temperature carbonization tar can also be employed. By treatment of the said oil at about 430° C. as hereinbefore described, the phenols, aromatic hydrocarbons and naphthalenes are reduced or hydrogenated, and in this manner in addition to small amounts of benzine a fraction boiling between 190° and 290° C. is obtained, which may also advantageously be employed as an illuminating oil. When employing a catalyst containing tungsten and zinc which is obtained in accordance with the present invention for the destructive hydrogenation of any carbonaceous initial material, it has been proved to be particularly advantageous to prepare the catalyst from 75 to 90 parts of tungstic acid and 25 to 10 parts of zinc oxide, since within these ranges the greatest possible efficiency is obtained.

Example 2

A mixture of hydrogen and an oil, poor in sulphur, boiling between 200° and 325° C. and obtained by the treatment of a topped American crude oil in the liquid phase with hydrogen in the presence of a catalyst, is passed at 425° C. under a pressure of 200 atmospheres over the catalyst described in Example 1. The hydrogen is led in circulation and a concentration of hydrogen sulphide of from 0.5 to 1 per cent is maintained therein. If the concentration of hydrogen sulphide falls below the said limit, such an amount of a volatile sulphur compound, as for example, carbon disulphide, or of a middle oil rich in sulphur is added to the circulating hydrogen or the product that the said concentration is continually maintained.

Example 3

92 parts of tungstic acid and 8 parts of magnesium oxide are worked up into a catalyst as described in Example 1. The said catalyst is then treated in the manner described in Example 1 with carbon disulphide and hydrogen under a pressure of 200 atmospheres. An oil boiling between 200° and 325° C., which has been obtained by catalytic destructive hydrogenation of a low temperature carbonization tar, is led at 425° C. together with hydrogen over the catalyst thus prepared. A product is obtained consisting for the most part of benzine boiling within the desired ranges, the parts not converted into benzine are substantially richer in hydrogen than the initial material.

Example 4

A fraction boiling between 200° and 325° C. obtained by distillation of a tar, which latter is obtained by low temperature carbonization of brown coal, is not suitable for cracking on account of its high content of compounds containing oxygen and sulphur, and of unsaturated compounds. In order to render this product suitable for cracking it is led at 390° C. together with hydrogen under a pressure of 200 atmospheres over the catalyst prepared and pretreated in the manner described in Example 1. By working in this manner the constituents which render cracking difficult or impossible are removed from the product or are converted into compounds innocuous to cracking without any substantial formation of benzene, so that the product substantially free from oxygen- or sulphur-containing substances and from unsaturated compounds may be subjected without difficulty to the cracking process.

Example 5

A catalytic mixture as referred to in Example 1 is treated with carbon disulphide in the manner described in the said example, and thereafter at a temperature of 425° C. an oil boiling between 200° and 325° C. obtained by the catalytic destructive hydrogenation of brown coal low-temperature carbonization tar in the liquid phase is passed over the catalyst together with hydrogen under a pressure of 200 atmospheres. About 40 per cent of benzine are recovered from the resulting product by distillation. The remainder which has a boiling point above 180° C. and which is practically completely free from oxygen and substantially free from sulphur, is then passed together with hydrogen under a pressure of 200 atmospheres and at about 475° C. over a catalyst consisting of equimolecular proportions of molybdic acid, zinc oxide and magnesium oxide. That portion which in this treatment is not converted into benzine is reintroduced into the same reaction vessel. In this way the whole of the product purified in the first treatment with hydrogen can be completely converted into benzine with the aid of the last mentioned catalyst.

Example 6

Instead of carrying out the sulphurization of the catalyst described in Example 1 with the aid of carbon disulphide, use may also be made for this purpose of the gases obtained in the destructive hydrogenation of distillable carbonaceous materials after the separation of the condensable constituents, which gases contain hydrogen sulphide and small amounts of organic sulphur compounds. Thus, for example, the gas may be used which is obtained in the catalytic destructive hydrogenation of brown coal low-temperature carbonization tar in the liquid phase wherein the hydrogen is used in circulation and the condensable constituents are separated from the gas after leaving the reaction vessel. This gas contains in addition to hydrogen and varying small amounts of gaseous hydrocarbons about 0.15 per cent of hydrogen sulphide and small amounts of organic sulphur compounds. When the catlytic mixture referred to in Example 1 is heated with this gas under a pressure of 200 atmospheres in about 80 hours to about 460° to 470° C. and then kept at this temperature for further 40 hours, the catalyst has the same activity in the destructive hydrogenation of oils as the other catalysts hereinbefore described.

What we claim is:—

1. A new catalyst containing in a combined state a negative element of the sixth group of the periodic system prepared by treating a material in the solid phase selected from the class consisting of the metals of the sixth group, vanadium and the oxides thereof with a volatile compound of a negative element of the sixth group of the periodic system in the divalent state and added free hydrogen in the absence of added hydrocarbons at a temperature of from 200° to 600° C.

2. A new catalyst containing combined sulphur prepared by treating in the solid phase an oxide of a metal selected from the class consisting of the metals of the sixth group and vanadium with a volatile compound of divalent sulphur and a gas comprising added free hydrogen at a temperature between 200° and 600° C. in the absence of added hydrocarbons.

3. A new catalyst containing combined sulphur prepared by treating an oxide of a metal of group six in the solid phase with a volatile compound of divalent sulphur and a gas comprising added free hydrogen at a temperature between 200° and 600° C. in the absence of added hydrocarbons.

4. A new catalyst containing combined sulphur prepared by treating an oxide of vanadium in the solid phase with a volatile compound of divalent sulphur and a gas comprising added free hydrogen at a temperature between 200° and 600° C. in the absence of added hydrocarbons.

5. A process for the production of a catalyst containing in a combined state a negative element of the sixth group of the periodic system which comprises treating a material selected from the class consisting of metals of the sixth group, vanadium and the oxides thereof in the solid phase with a volatile compound of a negative element of the sixth group of the periodic system in the divalent state and a gas comprising added free hydrogen at a temperature between 200° and 600° C. in the absence of added hydrocarbons.

6. A process for the production of a catalyst containing sulphur in a combined state which comprises treating a material comprising a metal selected from the class consisting of the metals of group six and vanadium in the solid phase with a volatile compound of divalent sulphur and a gas comprising added free hydrogen at a temperature between about 200° and 600° C. in the absence of added hydrocarbons.

7. A process for the production of a catalyst containing sulphur in a combined state which comprises treating a material comprising a metal selected from the class consisting of the metals of group six and vanadium in the solid phase with a volatile compound of divalent sulphur and a gas comprising added free hydrogen at a temperature between 200° and 600° C. and at an elevated pressure in the absence of added hydrocarbons.

8. A process for the production of a catalyst containing sulphur in a combined state which comprises treating an oxide selected from the class consisting of the oxides of the metals of group six and vanadium in the solid phase with a volatile compound of divalent sulphur and a gas comprising added free hydrogen at a temperature between 200° and 600° C. in the absence of added hydrocarbons.

9. A process for the production of a catalyst containing sulphur in a combined state which comprises treating an oxide of a metal of group six in the solid phase with a volatile compound of divalent sulphur and a gas comprising added free hydrogen at a temperature between 200° and 600° C. in the absence of added hydrocarbons.

10. A process for the production of a catalyst containing sulphur in a combined state which comprises treating an oxide of vanadium in the solid phase with a volatile compound of divalent sulphur and a gas comprising added free hydrogen at a temperature between 200° and 600° C. in the absence of added hydrocarbons.

11. A process for the production of a catalyst containing sulphur in a combined state which comprises treating a mixture of an oxide of a metal of the sixth group and zinc oxide in the solid phase with a volatile compound of divalent sulphur and a gas comprising added free hydrogen at a temperature between 200° and 600° C. in the absence of added hydrocarbons.

12. A process for the production of a catalyst containing sulphur in a combined state, which comprises treating a material comprising a metal in the solid phase with carbon bisulphide and hydrogen, at a temperature above 200° C., in the absence of added hydrocarbons.

13. A process for the production of a catalyst containing sulphur in a combined state, which comprises treating a material comprising a metal in the solid phase with about 1 atmosphere of carbon bisulphide and about 200 atmospheres of hydrogen, at a temperature above 200° C., in the absence of added hydrocarbons.

14. A process for the production of a catalyst containing sulphur in a combined state, which comprises treating a mixture of an oxide of a metal of the sixth group of the periodic system and zinc oxide in the solid phase with carbon bisulphide and hydrogen, at a temperature above 200° C., in the absence of added hydrocarbons.

15. A process for the production of a catalyst containing sulphur in a combined state, which comprises preparing a mixture of between 75 to 90 parts of tungstic acid and 25 to 10 parts of zinc oxide, moistening said mixture with water, drying the mass thus obtained, heating it gradually with hydrogen under a pressure of 200 atmospheres to a temperature of 200° C., gradually increasing the temperature to 460° C., and maintaining this temperature for about 48 hours while adding carbon bisulphide, in the absence of added hydrocarbons.

16. A process for the production of useful hydrocarbon products which comprises subjecting a distillable carbonaceous material to the action of a gas comprising hydrogen at a temperature above 200° C. and under superatmospheric pressures up to 1,000 atmospheres in the presence of the catalyst claimed in claim 1.

17. A process for the production of useful hydrocarbon products which comprises subjecting a distillable carbonaceous material to destructive hydrogenation conditions in the presence of the catalyst claimed in claim 1.

18. A process for the production of useful hydrocarbon products which comprises subjecting a distillable carbonaceous material to the action of a gas comprising hydrogen at a temperature between 300° and 350° C. and under pressures between 20 and 800 atmospheres in the presence of the catalyst claimed in claim 3.

19. A new catalyst containing in a combined state a negative solid element of the sixth group of the periodic system, prepared by treating a material selected from the class consisting of the metals of the sixth group, vanadium and the oxides thereof in the solid phase with a volatile compound of a negative element of the sixth group of the periodic system in the divalent state, and added free hydrogen, at a temperature between 200° and 600° C., at a pressure between 5 and 500 atmospheres and in the absence of added hydrocarbons.

20. A new catalyst containing combined sulphur, prepared by treating an oxide of a metal selected from the class consisting of the metals of group six and vanadium in the solid phase with a volatile compound of divalent sulphur and a gas comprising added free hydrogen at a temperature between 200° and 600° C., at a pressure between 5 and 500 atmospheres and in the absence of added hydrocarbons.

MATHIAS PIER.
WALTER KROENIG.